Jan. 21, 1964 J. G. WISTREICH ETAL 3,118,326
CONTROL SYSTEMS OF FORGING PRESSES
Filed Oct. 6, 1960 5 Sheets-Sheet 1

INVENTORS
JOHN GEORGE WISTREICH
PETER BAKER
BY
Hane and Nydich
ATTORNEYS

Jan. 21, 1964

J. G. WISTREICH ETAL 3,118,326

CONTROL SYSTEMS OF FORGING PRESSES

Filed Oct. 6, 1960

INVENTORS
JOHN GEORGE WISTREICH
PETER BAKER
BY

ATTORNEYS

Jan. 21, 1964   J. G. WISTREICH ETAL   3,118,326
CONTROL SYSTEMS OF FORGING PRESSES
Filed Oct. 6, 1960   5 Sheets-Sheet 5

INVENTORS
JOHN GEORGE WISTREICH
PETER BAKER
BY
ATTORNEY

United States Patent Office 3,118,326
Patented Jan. 21, 1964

3,118,326
CONTROL SYSTEMS OF FORGING PRESSES
John George Wistreich and Peter Baker, Sheffield, England, assignors to The British Iron and Steel Research Association, London, England
Filed Oct. 6, 1960, Ser. No. 60,856
15 Claims. (Cl. 78—13)

This invention relates to control systems, particularly for apparatus, such as a forging press, for shaping articles by the relative movement of press tools. Normally, in such apparatus, the bite of the press tools into the article, or the amount by which the article is deformed, is a predetermined fixed distance. However, we have discovered that this method is not the most appropriate when the shaping is effected in a series of successive press operations. We have discovered that, in these circumstances, the movement of the tools should be such that the penetration into the article is a particular fraction of the original dimension of the article in the direction of squeeze.

In accordance with the present invention, an automatic control system for apparatus for shaping an article under pressure by the relative movement of press tools, comprises means for causing the press tools to move to a prescribed separation, which is related to, and which is preferably a given proportion of, the initial thickness of the article to be shaped. By "initial thickness" is meant the value immediately prior to the stage of shaping about to be controlled. Preferably these means comprise a device which can be set to determine the minimum separation of the press tools and setting means for the device, which setting means is operated when the tools first engage the article.

Preferably, the control system is such that on the return motion of the press tools to the maximum separation, that maximum separation is automatically set to a value which exceeds the thickness of the piece by an absolute distance, which is preselected with the view to minimising unproductive movement of the press tools.

In a preferred form of the invention, a control system for a forging press having relatively movable press tools comprises means for generating a separation signal indicative of the separation of the press tools, means for detecting when the press tools first contact a workpiece therebetween, means controlled by the generating means and the detecting means for obtaining a comparison signal representing a prescribed proportion of the thickness of the workpiece, and means under the control of the comparison signal for controlling the press tools to a separation represented by the comparison signal.

The invention will be more readily understood by the following description, given by way of example, of an automatic control circuit for a forging press, reference being made to the accompanying drawings in which.

Figure 1:
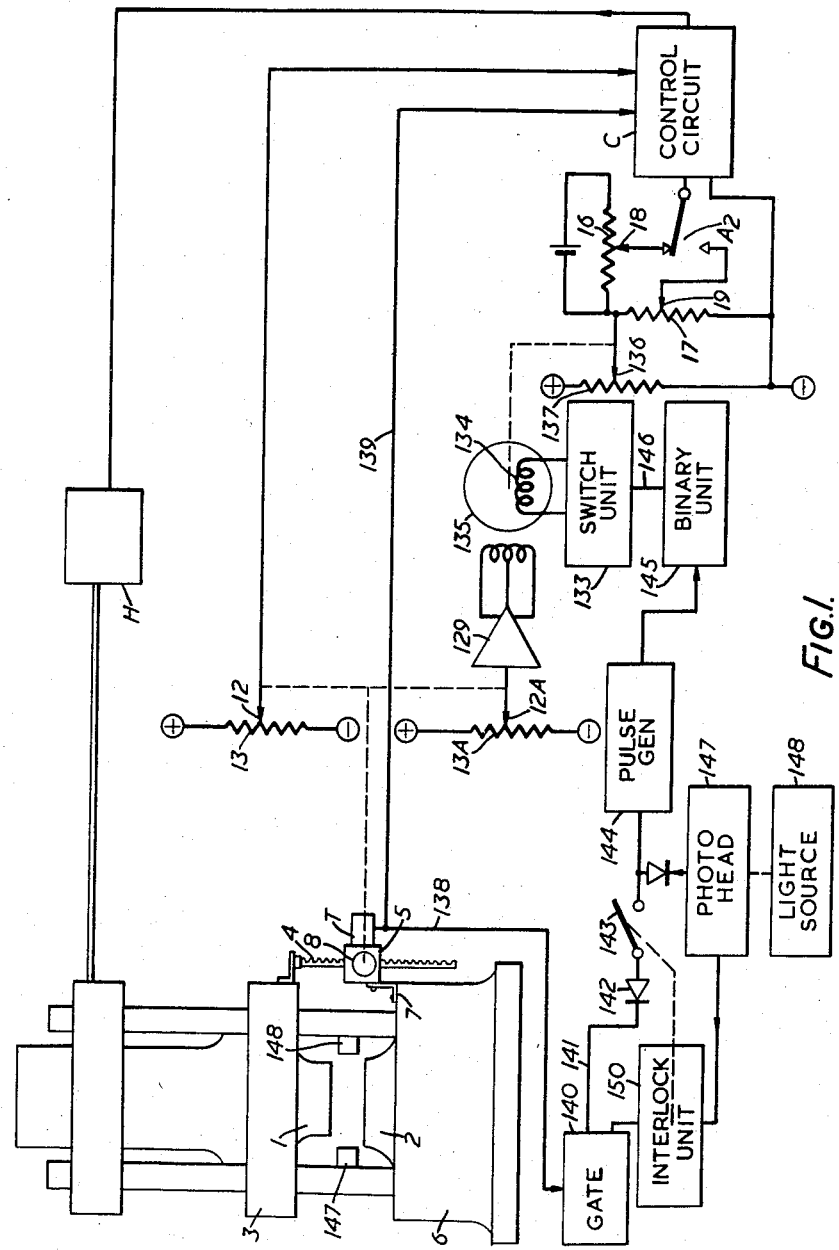
FIGURE 1 is a schematic diagram of the control circuit.

The press illustrated in the accompanying drawings is hydraulically operated and controlled. Referring to FIGURE 1, the moving press member 1 is controlled to move between upper and lower limit positions which are automatically determined in accordance with the initial dimensions of the workpiece to be forged.

The moving press member 1 cooperates with a fixed press member 2 and is carried on a cross head 3 which also carries a rack 4 cooperating with a pinion in a gearbox 5. The base 6 of the press contains, on its upper surface, the fixed press member 2 and carries the gearbox by means of a bracket 7. The gearbox 5 carries two rotary potentiometers, of which one is shown generally at 8, and a tacho-generator T. The resistance elements of the two rotary potentiometers are shown for convenience in the accompanying drawings at 13, 13A, and the sliding contacts 12, 12A are connected to the pinion in the gearbox 5 so that their positions, and thus the voltages from the potentiometers, are determined by the position of the cross head 3 relative to the base 6, and hence by the distance between the moving press member 1 and the fixed press member 2 located on the base 6. The tacho-generator T gives a voltage proportional to the speed of movement of the cross head 3.

There are a pair of further potentiometers 17, 16, which have sliding contacts 19, 18, the voltages from the potentiometers 17, 16 respectively determining the lower and upper positions to which the moving press member 1 is to be moved. These voltages are applied alternately through a switch $A_2$ to a press control circuit C which will be described in detail hereinafter; also applied to the circuit C are the voltages from the potentiometer 13 and the tacho-generator T. The control circuit C controls a hydraulic control circuit H which controls the movement of the press.

In operation, during downward movement of the press member 1, the voltage resulting from the combination of the voltage from sliding contact 12 and the voltage from the tacho-generator T is compared with that from the sliding contact 19 and the press is driven downwards by means of the hydraulic control circuit H until the difference voltage is zero. The downward movement of the press is then stopped, switch $A_2$ is automatically changed over and the voltage on sliding contact 12 is compared with that on sliding contact 18 which indicates the upper limit to which the press is to be driven. Control circuit C then operates the hydraulic control circuit H to cause upward movement of the press until press 1 reaches the set upper limit.

Having briefly described the operation of the control circuits C and H, a detailed description of these circuits will now be given, reference being made to FIGURES 2 to 5. For the sake of clarity, FIGURE 2 includes the potentiometer 12, 13 indicating the position of press tool 1, the top and bottom limit potentiometers 16, 18 and 17, 19 respectively and the tacho-generator T. It will be appreciated that the values of various electrical components given in FIGURES 2 to 5 are for the purposes of illustration only and the values actually used may differ from these.

Figure 2:
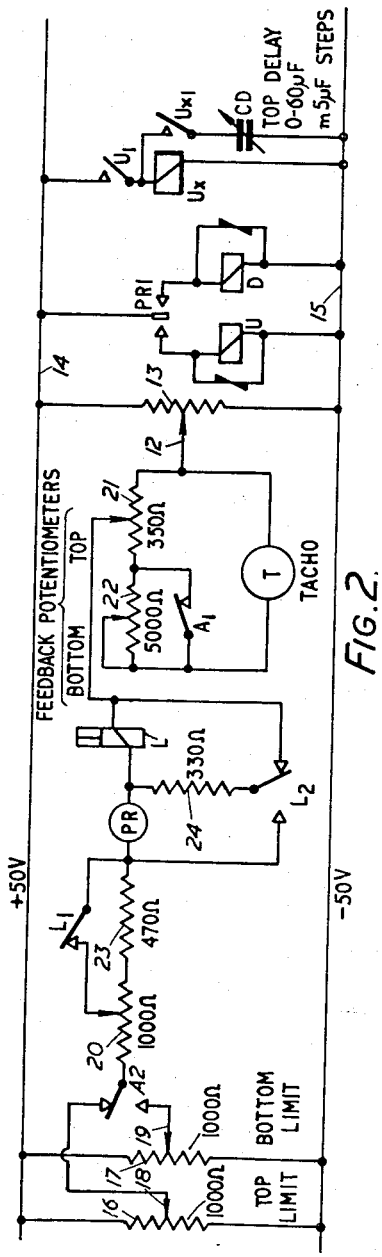
FIGURES 2 to 5 are circuit diagrams illustrating in detail, two portions of the control circuit shown in FIGURE 1.

Referring to FIGURE 2, the potentiometer 13 is connected across the supply lines 14, 15 as are the upper and lower potentiometers 16 and 17.

Sliders 18, 19 are connected to opposite poles of the switch $A_2$ previously referred to, which switch is formed by the contacts of a relay A. The moving contact of contacts $A_2$ is connected to a polarized relay PR through a voltage divider 20 and contacts $L_1$. By these means the voltage of slider 18, or of slider 19, is applied to relay PR and this voltage is opposed by the voltage of potentiometer 13, the slider 12 of which is connected through a voltage divider 21 to the relay PR.

The tacho-generator T previously referred to generates a voltage which is applied, either through contacts $A_1$ of relay A or, when contacts $A_1$ are open, through potentiometer 22, to voltage divider 21 so as to oppose the position-representing voltage from potentiometer 13.

The sensitive relay PR is protected from overloads by a relay L which is connected in series with relay PR. Relay L has the beforementioned contacts $L_1$ which normally short circuit a resistor 23 and contacts $L_2$ which connect a resistor 24 across either relay L or relay PR. When the current flow becomes excessive relay L is energized and contacts $L_1$, $L_2$ are moved from the positions shown in order to introduce series resistance and in order to shunt relay PR.

Polarized relay PR has contacts forming a center stable two-pole switch PR1 which, in one position, causes energization of an "Up" relay U controlling movement upwards of the press member, and, in the other position, causes energization of a "Down" relay D which controls downward movement. Relay U has contacts $U_1$ connected in series with a relay $U_x$ across supply lines 14, 15; a variable condenser $C_D$ is connected in parallel with relay $U_x$ to supply an adjustable delay between the opening of contacts $U_1$ and the deenergizing of relay $U_x$.

Figure 3:
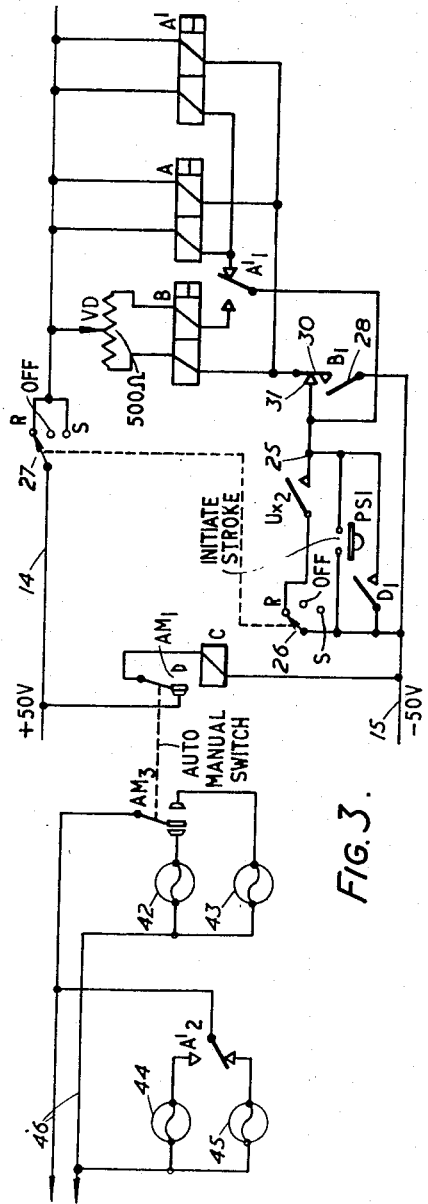

Relays D, $U_x$ have contacts $D_1$, $U_{x2}$ connected in parallel between supply line 15 and a terminal 25 (FIGURE 3). Contacts $U_{x2}$ are connected in series with a three position switch 26 while a button PS1 is connected in parallel with contacts $D_1$. Supply line 14 is connected through a three position switch 27 ganged with switch 26 to each of the windings of each of three relays A, $A^1$, B, and in particular is connected to relay B through voltage divider VD. Each of these relays has two windings and is operated only when current flows through one only of the windings. Relays A, $A^1$ are connected in parallel and operate together, one winding of each being connected to one pole of a switch $A_1^1$ of relay $A^1$. One winding of relay B is connected to the other stationary contact of contacts $A_1^1$, while the moving contact is connected to terminal 25. The remaining windings of relays A, $A^1$, B are commoned and connected to a contact assembly $B_1$ of relay B. This assembly has a moving contact 28 connected direct to supply line 15 and a spring contact 30 normally engaging a fixed contact 31. When relay B is energized contact 28 engages contact 30 and in so doing disengages contact 30 from contact 31.

Figure 4:
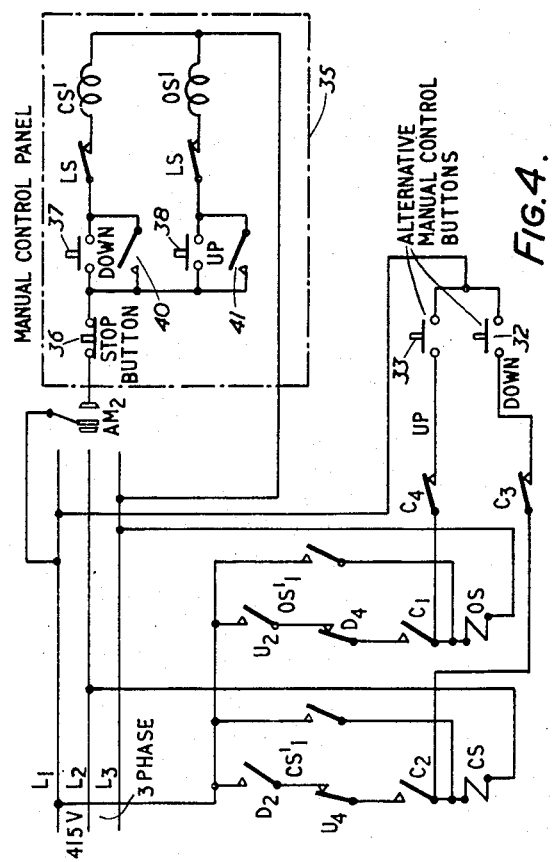

The movement of the press member 1 is regulated by a servo-motor having two windings which are shown at CS and OS in FIGURE 4, winding CS controlling downward motion and OS upward motion. Winding CS is connected in series with contacts $C_2$ of relay C, normally closed contacts $U_4$ of relay U, and normally open contacts $D_2$ of relay D across one of the phases of a 3-phase supply $L_1$, $L_2$, $L_3$. Similarly, winding OS is connected in series with contacts $C_1$ of relay C, normally closed contacts $D_4$ of relay D and normally open contacts $U_2$ of relay U across another phase of the supply. Winding CS and OS are alternately energizable by hand through contacts $C_3$ and down button 32, and through contacts $C_4$ and up button 33, respectively.

For the automatic control of the member 1, ganged switches $AM_1$, $AM_2$, $AM_3$ are placed in the left hand positions shown. This has the effect of energizing relay C and consequently of closing contacts $C_1$, $C_2$ and opening contacts $C_3$, $C_4$. When the switches are in their manual positions, relay C is de-energized and contacts $C_3$, $C_4$ close to enable the servo-motor to be controlled by buttons 32, 33.

During automatic control, the apparatus performs a cycle of operations in which the position-representing voltage from potentiometer 13 is compared with the bottom-limit signal from potentiometer 17, relay D is energized to cause downward motion of the member 1 until the signal applied to relay PR becomes zero, relay A changes over so that the voltage from potentiometer 13 is compared with that from potentiometer 18, relays U and $U_x$ are energized to cause upward motion of the member 1 until the signal applied to relay PR becomes zero again, and after a delay determined by condenser $C_D$, relay A operates to start the next cycle.

Considering the operation of the apparatus in detail, at rest the press member 1 is in the position determined by the top limit potentiometer 16, relay PR is de-energized and therefore relays U, $U_x$, D are de-energized.

For automatic repetitive motion of the member 1, switches $AM_1$, $AM_2$, $AM_3$ are put in their left hand positions, switches 26, 27 are placed in their "R" setting and button PS1 is pressed to initiate operation.

Pressing of button PS1 has the effect of causing relay B to operate since its left hand winding is energized. On operation of contacts $B_1$, relay B remains energized and relays A, $A_1$ remain de-energized until button PS1 is released when the voltage on the moving contact of switch $A_1^1$ is removed and relay A, $A^1$ are operated. Switch $A_2$ is changed over to connect the bottom limit potentiometer 17 to relay PR. Relay PR is operated to cause its contact PR1 to energize relay D, which in turn energizes winding CS through contacts $D_2$ and the member 1 is driven downward.

When relay D is energized, contacts $D_1$ (FIGURE 3) close and the voltage of line 15 is applied to contacts $A_1^1$. When this occurs, both windings of relay B are energized and relay B becomes non-operated. When however contacts $B_1$ reopen, the energization of relays A, $A^1$, B is unaltered.

As the member 1 is driven downwards, the resultant signal applied to relay PR decreases progressively and becomes zero shortly before the member 1 reaches the desired low limit, owing to the velocity-representing signal from tacho-generator T. When this occurs, relays PR and D and winding CS are de-energized and the member 1 comes to rest through its momentum at the lower limit.

When relay D is de-energized at the bottom of the travel of the member 1, contacts $D_1$ open; relays A, $A^1$, the right hand windings of which were formerly energized through contacts 30, 31 and contacts $D_1$, become non-operated, and contacts $A_1^1$ are restored to the position shown in FIGURE 3, relay B remaining de-energized. De-energizing of relay A changes over contacts $A_2$ which then connects upper limit potentiometer 16 to relay PR. Relay PR is operated to cause relay U to be energized. This in turn results in winding OS being energized by the closing of contacts $U_1$. The member 1 is driven upwards again.

Energizing relay $U_x$ causes contacts $U_{x2}$ to close and to apply the voltage of line 15 to both the windings of relays A, $A^1$ which remain non-operated. At the same time relay B is operated by the energization of its left hand winding. Contacts $B_1$ change over but, in so doing, the relays A, $A^1$, B are unaltered and, in particular, contacts $A_2$ remain as shown in FIGURE 2.

As determined by the signal supplied by the tacho-generator T, the signal applied to relay PR becomes zero shortly before the member 1 reaches the top limit, and relays PR, U and winding OS are de-energized, the member 1 reaching its upper limit under its momentum. Contacts $U_1$ open but relay $U_x$ is held energized by the discharge of condenser $C_D$ for a period dependent on the setting of the condenser. When relay $U_x$ finally is de-energized, contacts $U_{x2}$ (FIGURE 3) open; the energization of the left hand windings of relays A, $A^1$ is broken but the right hand windings remain energized through contacts 28, 30 so that relays A, $A^1$ become operated and contacts $A_2$ (FIGURE 2) change over to start a new cycle. The member 1 will therefore continue to reciprocate between the upper and lower limits, a delay being provided between the completion of the upward movement and the initiation of the successive downward movement. If no such delay is required, the relay $U_x$ may be removed, contacts $U_{x2}$ being replaced by contacts of relay U.

If it be desired that the member 1 shall be caused to make a single reciprocation only for each operation of button PS1, switches 26, 27 are moved to the "S" setting. In this case the downward movement of the member 1 is the same as described above. When relay D is de-energized near the bottom of the travel, relays A, $A^1$, B become de-energized, contacts $A_2$ change to the position shown in FIGURE 2 and the member 1 is driven upwards. Upward movement ceases as before at the upper limit by de-energization of relay U. Relays A, A¹, B remain de-energized and the member 1 remains at the upper limit until button PS1 is pressed again.

Manual control by the buttons 32, 33 when switches $AM_1$, $AM_2$ and $AM_3$ are in their right hand positions and relay C is de-energized is believed to be immediately obvious from FIGURE 4. This figure also shows a control panel 35 which can be used for manual control in place of buttons 32, 33. Switch $AM_2$ is connected to line $L_1$ and through the normally closed contacts 36 of a stop button to the contacts 37, 38 of an up button and a down button respectively. These contacts 37, 38 are connected in parallel to contacts 36 and are also connected separately to the winding of the intermediate relays $CS^1$, $OS^1$ and then to line $L_3$. Contacts 40, 41 are connected across contacts 37, 38 and are closed on appropriate operation of the intermediate relays. Relays $CS^1$, $OS^1$ have contacts $CS_1^1$, $OS_1^1$, in series with the windings CS, OS of the servo-motor, so that buttons 37, 38 control the servo-motor.

Indication of the operation of the apparatus is given by the indicator lamps shown in FIGURE 3. Lamps 42, 43 indicate automatic and manual operation respectively and are connected to opposite poles of switch $AM_3$. Lamps 44, 45 indicate that the member 1 is approaching or is at the bottom limit and top limit respectively and is connected to the fixed contacts of contacts $A_2^1$ of relay $A^1$. All the lamps are energized from low voltage, AC supply lines 46.

The servo-motor may take one of many forms, thus it may be an electric-motor operated by contactors, a hydraulic motor or the like.

Figure 5:
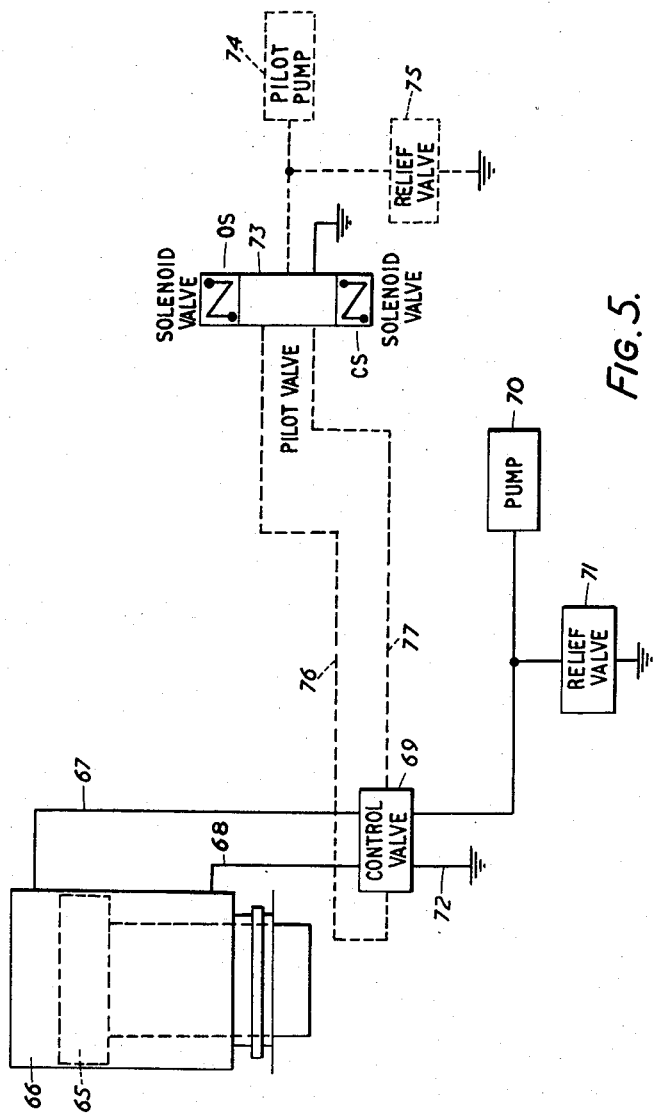

The hydraulic control circuit H of the press is shown in detail in FIGURE 5. A piston 65 works in a cylinder 66 and is coupled to the press member 1 and cross head 3. Liquid under pressure can be supplied to the piston above or below the piston through lines 67, 68 respectively. The supply of liquid to lines 67, 68 is controlled by a control valve 69 which is also connected to a pump 70 provided with a pressure relief valve 71 and to a discharge passage 72.

Valve 69 is of known type and is itself controlled hydraulically by a solenoid valve 73 having the windings OS, CS. Valve 73 is supplied by liquid under pressure through pilot pump 74 which has the usual pressure relief valve 75 to maintain a constant pressure.

Energization of winding OS causes liquid under pressure to pass through a pipe 76 and to operate valve 69 so that liquid from pump 70 is supplied below the piston 65 through pipe 68; at the same time pipe 67 is connected to the discharge passage 72 and the press opens. Similarly, energization of winding CS operates valve 69 through a pipe 77 to apply liquid from pump 70 to pipe 67 and to connect pipe 68 to the discharge passage 72; this has the effect of causing the piston 65 to descend and to close the press.

It will be observed from FIGURE 2 that the arrangement of contacts $A_1$ and voltage divider 22 are such that a larger velocity feedback signal is applied to the polarized relay PR while the member 1 is moving upwards than when it is moving downwards. This is because the final downward movement of the member 1 is resisted by deformation of the metal being forged so that the member is less likely to over-run at the bottom limit than at the top limit.

The delay provided by the condenser $C_D$ between successive reciprocations of the member 1 is to enable the ingot being forged to be manipulated. This manipulation may be controlled either by hand or automatically; in the latter case, the control of the manipulators may be linked to the control of the press so that manipulation occurs between the time the member 1 leaves the surface of the ingot and the time the member 1 starts the next penetration of the ingot.

It is a feature of the present specification that the voltage across potentiometer 17 varies continuously in proportion to the separation of the press tools, as will be described, as the press member 1 approaches a workpiece being forged, but ceases to vary when that member contacts the workpiece. Thus, at that instant the voltage across the potentiometer 17 represents the thickness of the workpiece. It is to be understood that the position of the sliding contact 19 has initially been set to correspond to a certain proportion of the initial workpiece thickness during any forging stroke. Therefore when the press member contacts the workpiece, the voltage on sliding contact 19 represents a certain proportion of the initial thickness of the workpiece and defines the lower limit of movement of the press member for that stroke. Again, as will be described, the voltage on sliding contact 18 represents the upper limit of movement of the press member and is the sum of the voltage representative of the thickness of the workpiece and a further voltage determined by the position of the sliding contact 18 on potentiometer 16.

Referring again to FIG. 1, the potentiometer 13A, 12A is accurately aligned with potentiometer 13, 12 so that the voltage on sliding contact 12A is exactly the same as that on sliding contact 12. This voltage is applied to the input of a servo amplifier 129 which controls the field of a servo motor 135 having an armature winding 134. The armature 134 is supplied through a switch unit 133 and servo motor 135 drives the sliding contact 136 of a further potentiometer 137 which is connected across the same voltage as are potentiometers 13, 13A. The operation of motor 135 is such that the sliding contact 136 is driven to follow sliding contact 12A exactly, so long as the armature 134 is supplied with power through switch unit 133. Sliding contact 136 is connected to one end of each of potentiometers 17, 16 while a voltage supply, independent of that across potentiometers 13, 13A, 137 is connected across potentiometer 16.

The voltage of tacho-generator T is applied to the control circuit H, as previously described, by way of line 139 and is also applied to a gate 140 by way of line 138. Gate 140 is arranged to give a voltage on the line 141 when the tacho-generator voltage exceeds a predetermined value, as will be described hereinafter. The voltage on line 141 is applied through rectifier 142 and a switch 143 to a pulse generator 144 which emits an output pulse when the voltage applied to it falls. The pulses from the pulse generator 144 are applied to a binary unit 145 which emits on line 146 a single pulse for each pair of pulses applied to it. Thus, of each pair of applied pulses, the first pulse initiates the output pulse on line 146, while the second pulse terminates the output pulse on line 146. The output on line 146 is applied to control the switch unit 133 as will be described hereinafter.

The pulse generator 144 is also supplied with pulses from a photo-head 147, which is mounted adjacent the press on forging members 1, 2, so that it is cut off from light from a light source 148 when a workpiece is between the press members 1, 2. An interlock unit 150 controlling the switch 143 is also supplied with pulses from the gate 140 and the photo-head 147. On the termination of a pulse from gate 140, the interlock unit 150 operates to open switch 143, until it is reset from a subsequent pulse from the photo-head 147.

Figure 6:
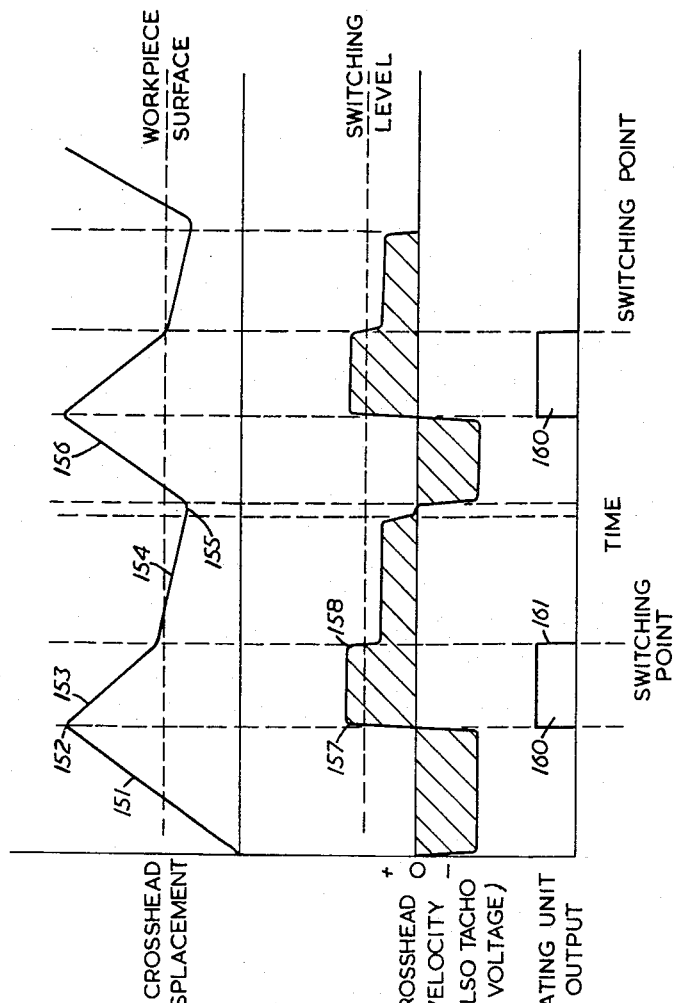
FIGURE 6 shows timing diagrams for the press.

In FIGURE 6, the upper timing chart shows typically the change in cross head displacement with time. The line 151 represents the upward withdrawal displacement of the moving press member 1 from its lowest position to a top limit 152. Thereafter, the press member is displaced relatively rapidly downwardly, as represented by the line 153 until it encounters the surface of the workpiece. The resistance to deformation of the workpiece reduces the speed of downward displacement of the press member 1, as represented by the inclination of the line 154. When the member 1 reaches its lower limit, further displacement in the downward direction is prevented and the member 1 remains for a short period of time at its lower limit, such duration being represented by the line 155, before starting its upstroke as represented by the line 156.

The lower chart of FIGURE 6, represents, on the same time scale, the cross head speed and the voltage from the tacho-generator T. It will be seen that the tacho-generator T produces a negative voltage corresponding to the initial upward movement of the press, followed by a relatively high voltage, between points 157 and 158, representing the movement downwardly of the press member 1 between the upper limit and the instant of contacting the workpiece. Thereafter, the velocity and voltage assumes a lower level.

The gate 140 is arranged to respond to a voltage from the tacho-generator T midway between that representing the relatively fast, unimpeded, downward movement of the press member 1 and that representing the relatively slow, resisted, downward movement of that member. When the voltage from tacho-generator T exceeds the switching level, a voltage is emitted by the gate 140. Thus, the gate 140 gives the output pulses indicated at 160.

The output pulse 160 from the gate 140 is applied to the pulse generator 144 which emits an ouput pulse on the termination 161 of the pulse 160, this trailing end coinciding with the initial contact of the press member 1 with the workpiece. When the pulse from the pulse generator 144 reaches the binary unit 145, a voltage appears on the line 146 to operate the switch unit 133 in order to open the connection in the supply to the armature 134 of servo-motor 135. Also, in the termination 161 of the pulse 160, the interlock unit 150 is operated to open the contacts 143 and to prevent the subsequent operation of the switch unit 133 by the press member 1 during the same pass. At the end of the pass, when the workpiece is removed from between the press or forging members 1, 2, the photo-head 147 is permitted to receive light from the light source 148 with the consequence that the output voltage from photo-head 147 falls so that the pulse generator 144 is operated, the output pulse from binary unit 145 is terminated and the switch unit reconnects the armature 134 with its supply. The output from photo-head 147, when it receives light from light source 148, also resets the interlock unit 150 and recloses contacts 143.

The operation of the control system will now be described in general terms, reference being made to FIGURES 1 and 6. Sliding contact 19 is initially adjusted to set the desired ratio between the lower limit of press movement and the initial thickness of the workpiece. Sliding contact 18 is similarly adjusted to set the height above the initial thickness of the workpiece, to which the press member 1 is to rise. The press is then put into operation and, on the first down stroke of the press member 1, that member moves down relatively fast initially, so that the gate 140 produces the pulse 160. During this time, the sliding contacts 12, 12A follow the movement of the cross head 3 and the voltage on sliding contact 12A is applied to the servo amplifier 129 which in turn supplies the field windings of servo motor 135. The sliding contact 136 of potentiometer 137 is therefore driven in accordance with the position of the press member 1. When the press member 1 contacts the surface of the workpiece, the downward movement of the member 1 is slowed, the pulse 160 is terminated and the switch unit 133 is opened, as described above. As a result, further movement of sliding contact 136 is prevented, regardless of subsequent movement of the sliding contacts 12, 12A of potentiometers 13, 13A. The voltage on sliding contact 19 is then a prescribed proportion of the voltage on slider 136 and the press is controlled, as previously described to stop downward displacement of the press member 1, when the latter has reached the position corresponding to the voltage on sliding contact 19. The press member 1 is then driven upwardly until it reaches a position corresponding to the voltage on the sliding contact 18. The voltage on contact 18 is the sum of the voltage on sliding contact 136 and a fixed voltage determined by the position of sliding contact 18 on potentiometer 16; therefore, the press member will be stopped at its upper limit at a fixed position above the initial thickness of the workpiece.

During subsequent strokes of the same pass, between which the workpiece is moved longitudinally between the press members 1, 2, the upper and lower limits of the press movement remain unaltered, since the gate 140 is disconnected from the pulse generator 144 by the opening of contacts 143 and since the workpiece remains between the forging members 1, 2 and the photo-head 147 does not reset the interlock unit 50. Therefore, in each subsequent stroke in the same pass, the press member 1 is lowered to the same position, so as to produce a forging of constant thickness. At the end of the pass, the workpiece is withdrawn from between the forging members 1, 2, the photo-head 147 receives light from the light source 148, a pulse is emitted by the binary unit 145 to operate the switch unit 133 and thereby reconnect armature 134 to its supply, and the interlock unit is reset to reclose contacts 143 ready for the next pass. In the next pass, the sliding contact 136 is repositioned at the point at which the workpiece is first engaged by the press member 1 during that pass, so as to reset the lower and upper limits to travel of the press member 1, as before.

It will be appreciated that the purpose of the gate 140, pulse generator 144, binary unit 145 and switch unit 133 is to isolate the armature 134 of servo motor 135 from the armature supply, when the press member 1 first engages the workpiece. This purpose may be achieved alternatively by operating the switch unit 133 by a switch which responds to the pressure in the hydraulic system operating the press; while the press member 1 is moving down rapidly, unimpeded by the workpiece, the pressure is relatively low, whereas when it encounters the resistance of the workpiece, the pressure rises suddenly. The switch may be arranged to respond to this sudden increase in pressure to operate the switch unit and thereby disconnect the armature of servomotor 135 from the supply.

Where it is desired that the switch unit 133 and the contacts 143 be reset before the end of the workpiece clears the press, the photo-head 147 may be replaced by a simple manually-operated switch.

What is claimed is:

1. Apparatus for shaping an article under pressure by the relative movement of press tools, comprising means for detecting when the separation of said press tools equals the thickness of said article before shaping; selecting means, under the control of said detecting means, for automatically selecting a minimum separation of said press tools, said minimum separation being smaller than but related to the thickness of said article before shaping; and a control system for preventing further relative movement of said press tools when the separation for said press tools substantially equals said selected minimum separation.

2. Apparatus for shaping an article under pressure by the relative movement of press tools, comprising means for emitting a separation signal indicative of the separation of said press tools; means for detecting when the separation of said press tools equals the thickness of said article before shaping; selecting means, under the control of said separation signal and said detecting means, for automatically selecting a minimum separation of said press tools when the separation of said press tools equals the thickness of said article before shaping, said minimum separation being smaller than but related to the thickness of said article before shaping; means for emitting a comparison signal indicative of said selected minimum separation and a control system under the control of said separation signal and said comparison signal for causing relative movement of the press tools but preventing further relative movement when the separation signal substantially equals said comparison signal.

3. Apparatus as claimed in claim 2, wherein said selecting means includes means, controlled by said means for emitting said separation signal, for emitting a signal varying in proportion with said separation signal; and disabling means, controlled by said detecting means, for preventing further variation of said signal which varies in proportion with said separation signal when the separation of said press tools equals the thickness of said article before shaping.

4. Apparatus as claimed in claim 3, wherein said selecting means includes further means for deriving from said means for emitting a signal varying in proportion with said separation signal, a signal which has a given proportion of said emitted signal and which forms said comparison signal indicative of said minimum separation of said press tools.

5. Apparatus as claimed in claim 3, wherein said selecting means includes further means for adding a signal to said signal varying in proportion with said separation signal, the signal output from which adding means being a further comparison signal indicative of a maximum separation of said press tools; and said control system includes means under the control of said separation signal and said further comparison signal for causing relative movement of the press tools but preventing further relative movement when the separation signal substantially equals said further comparison signal.

6. Apparatus as claimed in claim 3, comprising means for deriving, from said means for emitting a signal varying in proportion with said separation signal, a signal which has a given proportion of said emitted signal and which forms said comparison signal indicative of said minimum separation of said press tools; means for adding a signal to said signal varying in proportion with said separation signal, the signal output from which adding means being a further comparison signal indicative of a maximum separation of said press tools; means under the control of said separation signal and said comparison signals for causing relative movement of the press tools but preventing further relative movement when the separation signal substantially equals said comparison signals; a servo-motor for controlling said means for emitting a signal varying in proportion with said separation signal; and means, under the control of said detecting means, for de-energizing said servo-motor.

7. Apparatus as claimed in claim 6, comprising a first potentiometer, coupled to one of said press tools, for determining said separation signal, a second potentiometer for determining a first voltage varying in proportion with said separation signal, and a third potentiometer, coupled to said first potentiometer, for energizing the field circuit of said servo-motor.

8. Apparatus as claimed in claim 7, comprising a dividing device responsive to said first voltage which dividing device is adjustable to determine a second voltage which has a given proportion of said first voltage and represents said minimum separation of said press tools.

9. Apparatus as claimed in claim 8, comprising a fourth potentiometer for determining a fixed third voltage to be added to said first voltage to determine a fourth voltage representing said maximum separation of said press tools.

10. Apparatus as claimed in claim 9, wherein said control system includes means for comparing said separation signal alternately with said second voltage and said fourth voltage, and means for causing relative reciprocatory movement of said press tools between said minimum and maximum separations.

11. Apparatus as claimed in claim 2, wherein said detecting means includes a tacho-generator for generating a signal representing the speed of relative movement of said press tools, and means responsive to said tacho-generator signal when that signal falls below a predetermined value.

12. Apparatus as claimed in claim 2, comprising a hydraulic circuit for operation of the press tools, and wherein the detecting means is responsive to the increase in pressure in said hydraulic circuit resulting from initial engagement of the press tools with an article to be shaped.

13. Apparatus as claimed in claim 2, wherein said detecting means, when operated, prevents alteration of said comparison signals indicative of said minimum and maximum separations during a succession of relative reciprocatory movements of said press tools.

14. Apparatus as claimed in claim 13, comprising means for detecting the absence of an article between said press tools, and operative to permit alteration of said comparison signals indicative of said minimum and maximum separations.

15. Apparatus as claimed in claim 14, wherein said means for detecting the absence of an article includes a light source and light sensitive means disposed for activation by said source only in the absence of an article between the press tools.

References Cited in the file of this patent

UNITED STATES PATENTS 2,110,593   Ernst _____ Mar. 8, 1938

FOREIGN PATENTS 1,223,886   France _____ June 21, 1960